United States Patent [19]

Picciallo

[11] Patent Number: 5,765,695
[45] Date of Patent: Jun. 16, 1998

[54] WALL MOUNTED COMPACT DISC CASE HOLDER ASSEMBLY

[76] Inventor: David J. Picciallo, 94 N. Ramapo Ave., Mahawah, N.J. 07430

[21] Appl. No.: 642,935

[22] Filed: May 6, 1996

[51] Int. Cl.$^6$ .................................................. A47F 7/00
[52] U.S. Cl. ........................................................... 211/40
[58] Field of Search ................................ 211/40, 104, 88, 211/132, 195, 41, 85

[56] References Cited

U.S. PATENT DOCUMENTS

| | | | |
|---|---|---|---|
| 4,765,469 | 8/1988 | Seifert | 211/40 X |
| 5,180,058 | 1/1993 | Hu | 211/40 X |
| 5,351,835 | 10/1994 | Hallgren | 211/40 |
| 5,439,119 | 8/1995 | Chow | 211/40 |

*Primary Examiner*—Alvin C. Chin-Shue
*Assistant Examiner*—Sarah L. Purol

[57] ABSTRACT

A wall mounted compact disc case holder assembly for use in association with a wall and compact disc cases, the apparatus comprising: a plurality of case holders each having a front surface and a rear surface, an upper edge, a lower edge, an open side wall, a closed side wall and a hollow interior, in an operative orientation a user positioning a compact disc within the hollow interior of each case holder; the upper and lower edges of each case holder including a plurality of hinge members, each hinge member including a canal extending therethrough; a plurality of pins each being positioned within the canal of the hinge members thereby pivotally coupling the hinge members together; and a mounting clip being affixed to a case holder, an in operative orientation the mounting clip being coupled to a wall thereby suspending the apparatus in a vertical position, in a stored orientation the apparatus being folded whereby the case holders being positioned in a stacked orientation.

6 Claims, 4 Drawing Sheets

WALL MOUNTED COMPACT DISC CASE HOLDER ASSEMBLY

BACKGROUND OF THE INVENTION

1. Field of the Invention

The present invention relates to a wall mounted compact disc case holder assembly and more particularly pertains to allowing a user to view compact disc cases which are in the same order as the discs in a compact disc changer.

2. Description of the Prior Art

The use of compact disc storage displays is known in the prior art. More specifically, compact disc storage displays heretofore devised and utilized for the purpose of storing and displaying compact discs are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,246,107 to Long et al. discloses a wallet style compact disc storage unit.

U.S. Pat. No. 4,951,826 to Tompkins discloses a compact disc display and storage board.

U.S. Pat. No. Des. 322,286 to Rockola et al. discloses a compact disc album cover display.

U.S. Pat. No. Des. 354,413 to Sedon et al. discloses a compact disc storage and display rack.

U.S. Pat. No. 5,052,264 to Zuzack discloses a compact disc display rack.

U.S. Pat. No. 5,040,687 to Whittington discloses a wall-mounted compact disc display.

While these devices fulfill their respective, particular objective and requirements, the aforementioned patents do not describe a wall mounted compact disc case holder assembly for allowing a user to view compact disc cases which are in the same order as the discs are in a compact disc changer.

In this respect, the wall mounted compact disc case holder assembly according to the present invention substantially departs from the conventional concepts and designs of the prior art, and in doing so provides an apparatus primarily developed for the purpose of allowing a user to view compact disc cases which are in the same order as the discs are in a compact disc changer.

Therefore, it can be appreciated that there exists a continuing need for new and improved wall mounted compact disc case holder assembly which can be used for allowing a user to view compact disc cases which are in the same order as the discs are in a compact disc changer. In this regard, the present invention substantially fulfills this need.

SUMMARY OF THE INVENTION

In the view of the foregoing disadvantages inherent in the known types of compact disc storage displays now present in the prior art, the present invention provides an improved wall mounted compact disc case holder assembly. As such, the general purpose of the present invention, which will be described subsequently in greater detail, is to provide a new and improved wall mounted compact disc case holder assembly and method which has all the advantages of the prior art and none of the disadvantages.

To attain this, the present invention essentially comprises a new and improved wall mounted compact disc case holder assembly for use in association with a wall and compact disc cases each having a label and a length of 5⅝ inches, a width of 4¹⁵⁄₁₆ inches and a thickness of ⁷⁄₁₆, the apparatus comprising, in combination: top and bottom case holders and four central case holders, each case holder having a front surface and a rear surface, an upper edge, a lower edge, an open side wall, a closed side wall and a hollow interior, each case holder being fabricated of plastic and formed in a generally rectangular configuration with a length of five inches, a width of six inches and a thickness of ⁹⁄₁₆ inches, each case holder including an internal window formed in a generally rectangular configuration, the window having a height of four inches, the front surface including a finger slot formed therein adjacent the open side wall, in an operative orientation a user positioning a compact disc within the hollow interior of each case holder with the label positioned adjacent the window, the finger slots facilitating removal of compact disc cases positioned within the hollow interior of a holder; the lower edge of the top case holder and center case holders each including first, second and third hinge members, the hinge members being fabricated of plastic and formed in a generally cylindrical configuration with a length of one inch and a width of ¼ inch, each hinge member including a canal extending therethrough, each first hinge member being positioned adjacent each open sidewall, each second hinge member being positioned adjacent each closed side wall, each third hinge member being positioned adjacent the center point of each lower edge; the upper edge of the bottom case holder and center case holders each including fourth and fifth hinge members, each fourth hinge member being positioned between the center point of each upper edge and associated open sidewall, each fifth hinge member being positioned between the center point of each upper edge and associated closed side wall; five pins fabricated of plastic and formed in an elongated cylindrical configuration, in an operative orientation the fourth and fifth hinge members being positioned between the first, second and third hinge members, the pin being positioned within the canal of the hinge members thereby pivotally coupling the hinge members together; and a mounting clip formed in a generally rectangular configuration with a planar upper edge and a lower edge including a plurality of triangular teeth, the mounting clip being affixed to the top case holder, in an operative orientation the mounting clip being coupled to a wall thereby suspending the apparatus in a vertical position, in a stored orientation the apparatus being folded whereby the case holders being positioned in a stacked orientation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wall mounted compact disc case holder assembly which has all the advantages of the prior art compact disc storage displays and none of the disadvantages.

It is another object of the present invention to provide a new and improved wall mounted compact disc case holder assembly which may be easily and efficiently manufactured and marketed.

It is a further object of the present invention to provide a new and improved wall mounted compact disc case holder assembly which is of durable and reliable construction.

An even further object of the present invention is to provide a new and improved wall mounted compact disc case holder assembly which is susceptible of a low cost of manufacture with regard to both materials and labor, and which accordingly is then susceptible of low prices of sale to the consuming public, thereby making such a wall mounted compact disc case holder assembly economically available to the buying public.

Still yet another object of the present invention is to provide a new and improved wall mounted compact disc case holder assembly which provides in the apparatuses and methods of the prior art some of the advantages thereof, while simultaneously overcoming some of the disadvantages normally associated therewith.

Even still another object of the present invention is to provide a new and improved wall mounted compact disc case holder assembly for allowing a user to view compact disc cases which are in the same order as the discs are in a compact disc changer.

Lastly, it is an object of the present invention to provide a new and improved wall mounted compact disc case holder assembly for use in association with a wall and compact disc cases, the apparatus comprising: a plurality of case holders each having a front surface and a rear surface, an upper edge, a lower edge, an open side wall, a closed side wall and a hollow interior, in an operative orientation a user positioning a compact disc within the hollow interior of each case holder; the upper and lower edges of each case holder including a plurality of hinge members, each hinge member including a canal extending therethrough; a plurality of pins each being positioned within the canal of the hinge members thereby pivotally coupling the hinge members together; and a mounting clip being affixed to a case holder, an in operative orientation the mounting clip being coupled to a wall thereby suspending the apparatus in a vertical position, in a stored orientation the apparatus being folded whereby the case holders being positioned in a stacked orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
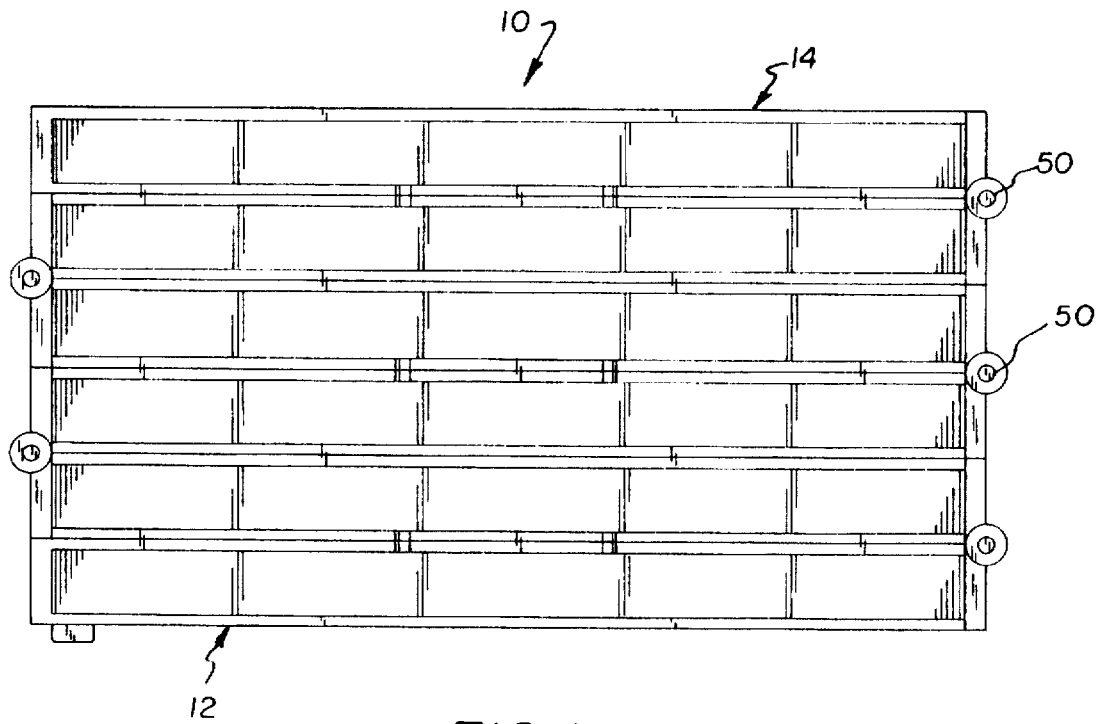
FIG. 1 is a perspective view of the wall mounted compact disc case holder assembly positioned in a stored orientation.

With reference now to the drawings, and in particular, to FIG. 1 thereof, the preferred embodiment of the new and improved wall mounted compact disc case holder assembly embodying the principles and concepts of the present invention and generally designated by the reference number 10 will be described.

Specifically, it will be noted in the various Figures that the device relates to a wall mounted compact disc holder assembly 10 for allowing a user to view compact disc cases. In its broadest context, the device consists of a top case holder 12, a bottom case holder 14 and center case holders 16. Such components are individually configured and correlated with respect to each other so as to attain the desired objective.

The wall mounted compact disc case holder assembly is adapted for use in association with a wall and compact disc cases. A conventional compact disc case has a label on its front surface and a side edge. A conventional compact disc case has a length of 5⅝ inches, a width of 4¹⁵⁄₁₆ inches and a thickness of ⁷⁄₁₆.

Figure 4:
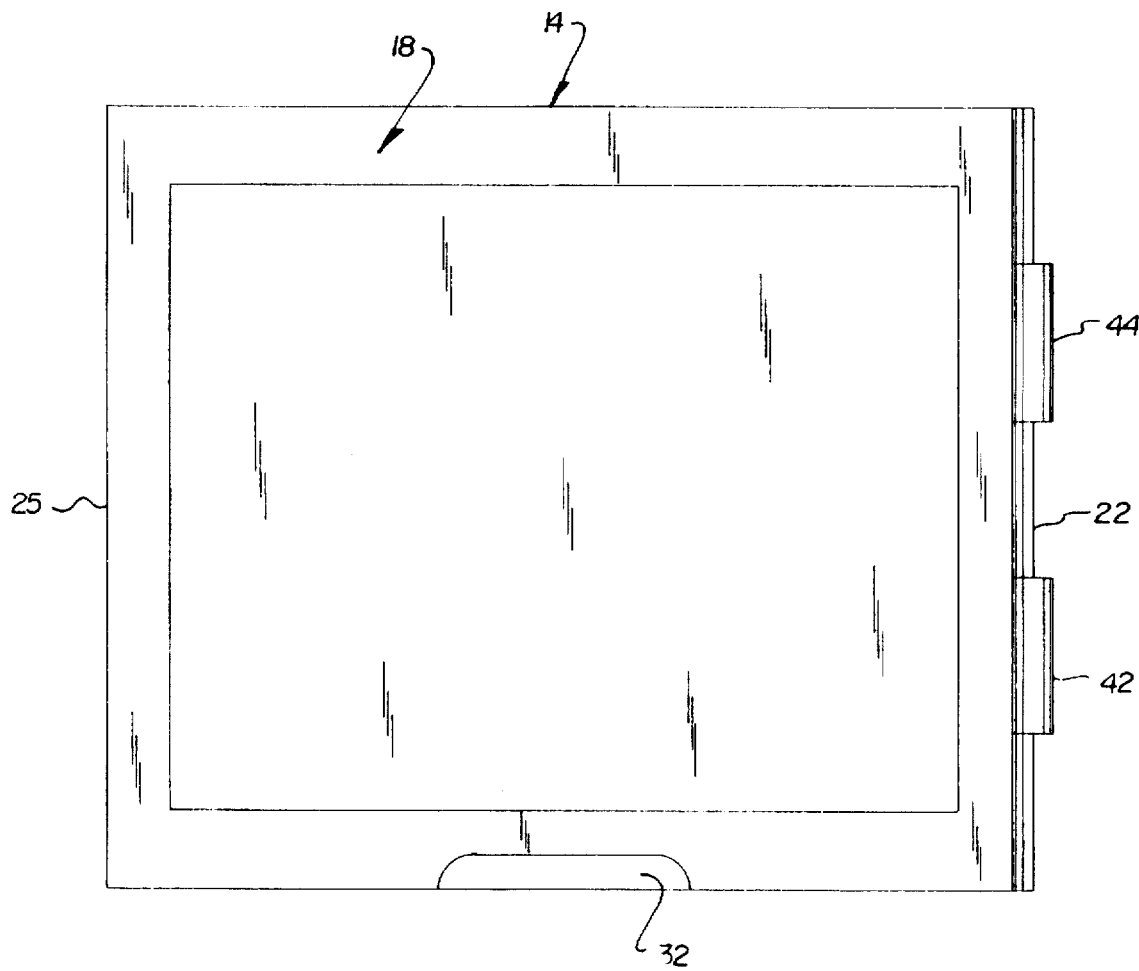
FIG. 4 is a front perspective view of the upper surface the bottom case holder of the apparatus.
Figure 5:
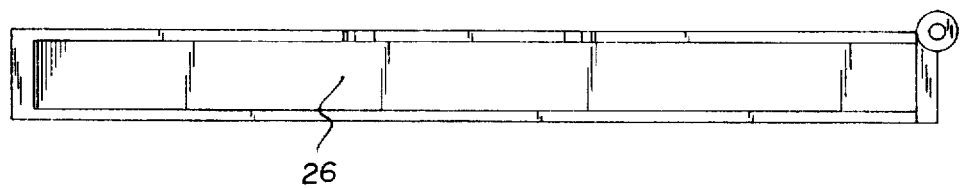
FIG. 5 is a side perspective view of the bottom case holder of the apparatus.
Figure 6:
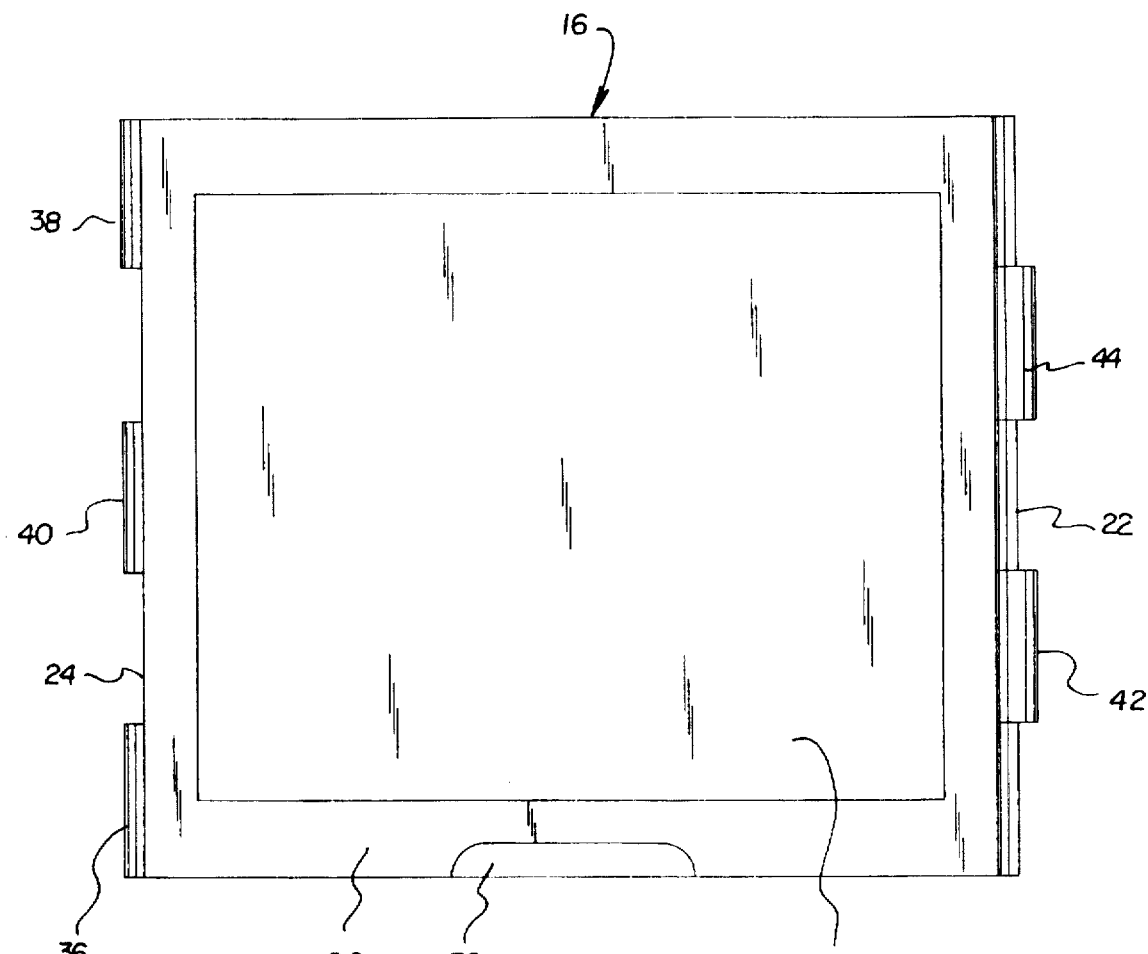
FIG. 6 is a front perspective view of a center case holder of the apparatus.
Figure 7:
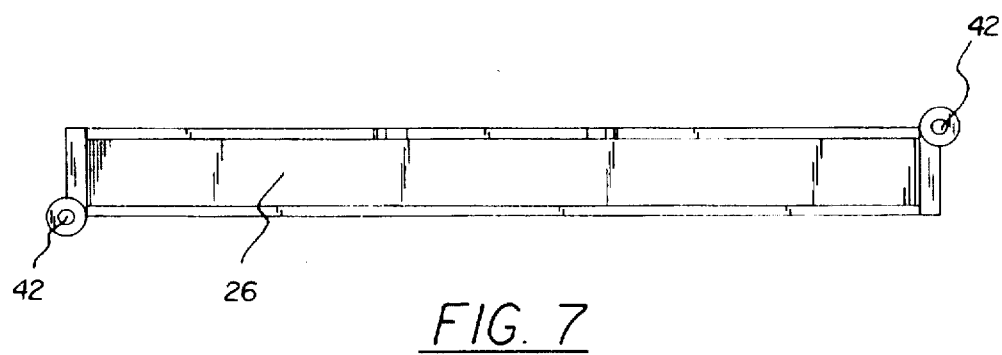
FIG. 7 is a side perspective view of a center case holder of the apparatus.
Figure 8:
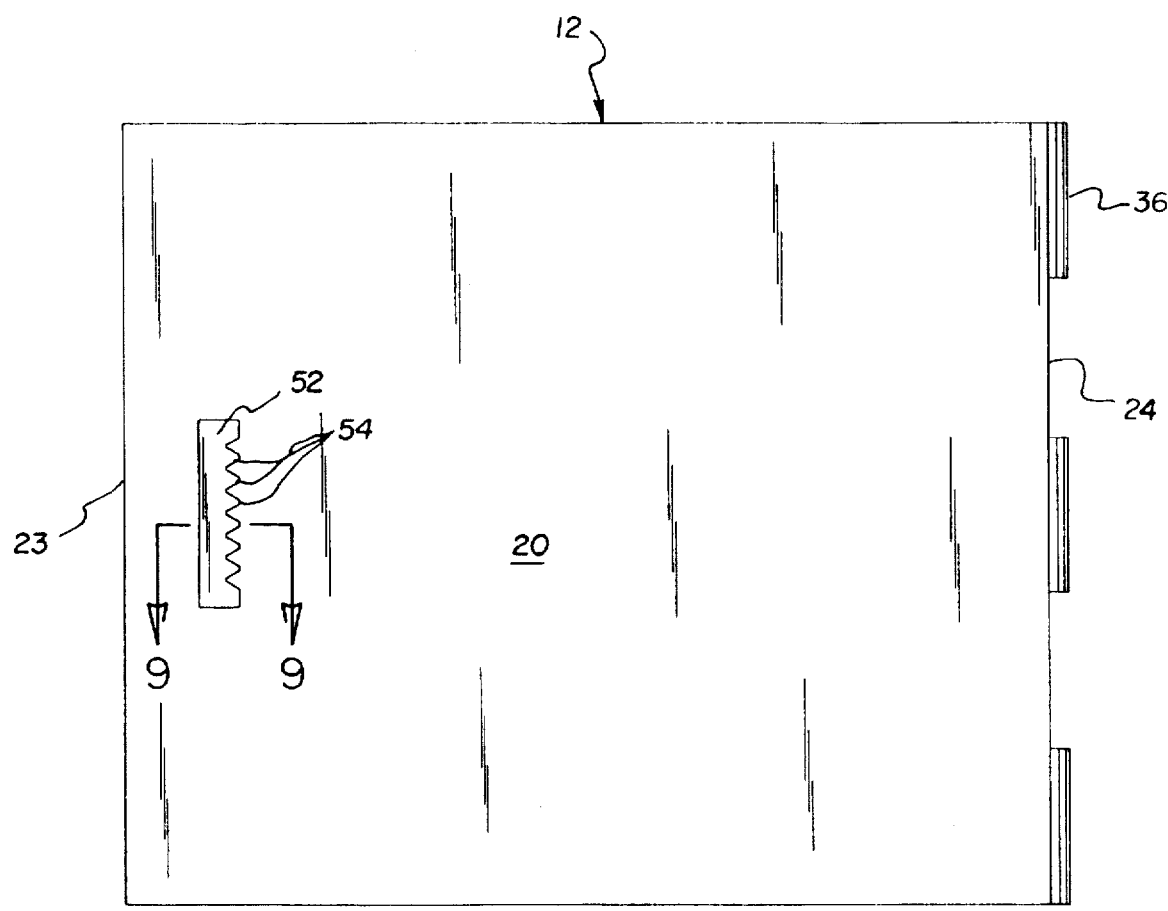
FIG. 8 is a rear perspective view of the top case holder illustrating the mounting clip.

The apparatus includes top 12 and bottom 14 case holders and four central case holders 16. Each case holder has a front surface 18 and a rear surface 20, an upper edge 22, 23, a lower edge 24, 25 an open side wall 26, a closed side wall and a hollow interior. In the preferred embodiment each case holder is fabricated of plastic and formed in a generally rectangular configuration with a length of five inches, a width of six inches and a thickness of ⁹⁄₁₆ inches. Each case holder includes an outer border 28 and an internal window 30. The outer border provides strength and stability to the apparatus. In varying embodiments of the apparatus the border is transparent or fabricated in one or more solid colors. The internal window is transparent and formed in a generally rectangular configuration with a height of four inches. Note FIGS. 4 and 6.

The front surface 18 includes a generally semioval finger slot 32 formed within it. The finger slot is positioned adjacent the open side wall 26. In an operative orientation a user slides a compact disc within the hollow interior of each case holder with the label on the front surface of the compact disc positioned adjacent the window. The label on the edge of the compact disc is positioned adjacent to the open side wall 26. The finger slots 32 facilitate removal of compact disc cases from the holders. Note FIGS. 4–7.

The lower edge 24 of the top case holder and center case holders each include first 36, second 38 and third 40 hinge members. The hinge members are fabricated of plastic and formed in a generally cylindrical configuration with a length of one inch and a width of ¼ inch. Each hinge member includes a canal 42 extending through it. Each first hinge member 36 is positioned adjacent each open sidewall. Each second hinge member 38 is positioned adjacent each closed side wall. Each third hinge member 40 is positioned adjacent the center point of each lower edge. Note FIGS. 4–8.

The upper edge of the bottom case holder and center case holders each include fourth 42 and fifth 44 hinge members. Each fourth hinge member 42 is positioned between the center point of each upper edge and associated open sidewall. Each fifth hinge member 44 is positioned between the center point of each upper edge and associated closed side wall. Note FIGS. 4–8.

Figure 2:
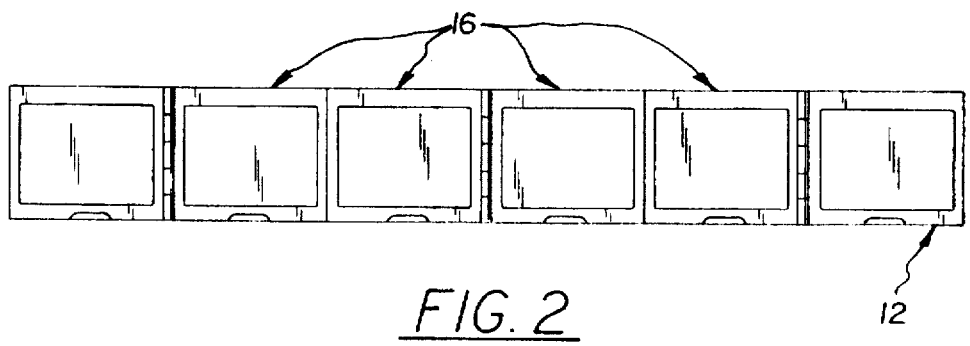
FIG. 2 is a front perspective view of the apparatus in an extended orientation.
Figure 3:
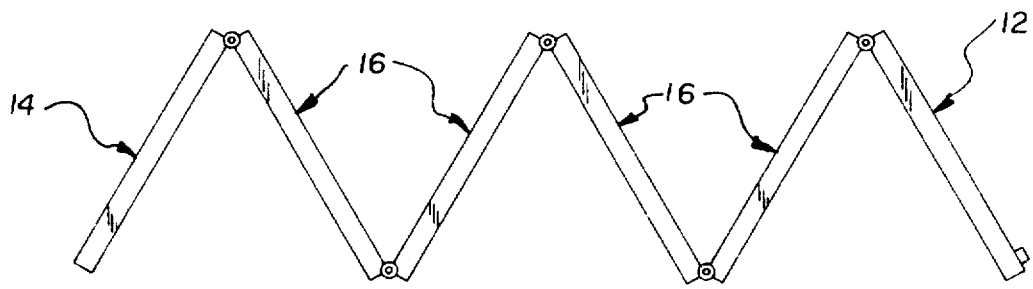
FIG. 3 is a side perspective view of the apparatus in a condensed orientation.

Five pins 50 are fabricated of plastic and formed in an elongated cylindrical configuration. In an operative orientation the fourth and fifth hinge members are positioned between the first, second and third hinge members. The pins are positioned within the canal of the hinge members thereby pivotally coupling the hinge members together. This coupling method enables users to store the apparatus in a stacked orientation by folding the holders one on top of another along the hinges. Note FIGS. 1 and 2.

Figure 9:
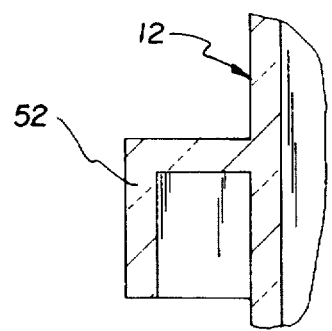
FIG. 9 is a cross sectional view of the mounting clip taken along section line 9—9 of FIG. 8.

A mounting clip 52 is formed in a generally rectangular configuration with a planar upper edge and a lower edge including a plurality of triangular teeth 54. The mounting clip is affixed to the top case holder 12. In an operative orientation the mounting clip is coupled to a wall thereby suspending the apparatus in a vertical position. This enables a user to view the cases in the same order as the compact discs would be played if positioned in a 6 CD player. Note FIGS. 8 and 9.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved wall mounted compact disc case holder assembly for use in association with a wall and compact disc cases each having a label and a length of 5⅝ inches, a width of 4¹⁵⁄₁₆ inches and a thickness of ⁷⁄₁₆, comprising, in combination:

top and bottom case holders and four central case holders, each case holder having a front surface and a rear surface, an upper edge, a lower edge, an open side wall, a closed side wall and a hollow interior, each case holder being fabricated of plastic and formed in a generally rectangular configuration with a length of five inches, a width of six inches and a thickness of ⁹⁄₁₆ inches, each case holder including an internal window formed in a generally rectangular configuration, the window having a height of four inches, the front surface including a finger slot formed therein adjacent the open side wall, in an operative orientation a user positioning a compact disc within the hollow interior of each case holder with the label positioned adjacent the window, the finger slots facilitating removal of compact disc cases positioned within the hollow interior of a holder;

the lower edge of the top case holder and center case holders each including first, second and third hinge members, the hinge members being fabricated of plastic and formed in a generally cylindrical configuration with a length of one inch and a width of ¼ inch, each hinge member including a canal extending therethrough, each first hinge member being positioned adjacent each open sidewall, each second hinge member being positioned adjacent each closed side wall, each third hinge member being positioned adjacent the center point of each lower edge;

the upper edge of the bottom case holder and center case holders each including fourth and fifth hinge members, each fourth hinge member being positioned between the center point of each upper edge and associated open sidewall, each fifth hinge member being positioned between the center point of each upper edge and associated closed side wall;

five pins fabricated of plastic and formed in an elongated cylindrical configuration, in an operative orientation the fourth and fifth hinge members being positioned between the first, second and third hinge members, the pin being positioned within the canal of the hinge members thereby pivotally coupling the hinge members together; and a mounting clip formed in a generally rectangular configuration with a planar upper edge and a lower edge including a plurality of triangular teeth, the mounting clip being affixed to the top case holder, in an operative orientation the mounting clip being coupled to a wall thereby suspending the apparatus in a vertical position, in a stored orientation the apparatus being folded whereby the case holders being positioned in a stacked orientation.

2. A wall mounted compact disc case holder assembly for use in association with a wall and compact disc cases, comprising:

a plurality of case holders each having a front surface and a rear surface, an upper edge, a lower edge, an open side wall, a closed side wall and a hollow interior, in an operative orientation a user positioning a compact disc within the hollow interior of each case holder;

the upper and lower edges of each case holder including a plurality of hinge members, each hinge member including a canal extending therethrough;

a plurality of pins each being positioned within the canal of the hinge members thereby pivotally coupling the hinge members together; and a mounting clip being affixed to a case holder, an in operative orientation the mounting clip being coupled to a wall thereby suspending the apparatus in a vertical position, in a stored orientation the apparatus being folded whereby the case holders being positioned in a stacked orientation.

3. The wall mounted compact disc case holder assembly as set forth in claim 2 wherein each case holder is fabricated of plastic and formed in a generally rectangular configuration with a length of five inches, a width of six inches and a thickness of 9/16 inches.

4. The wall mounted compact disc case holder assembly as set forth in claim 3 wherein each hinge member is fabricated of plastic and formed in a generally cylindrical configuration with a length of one inch and a width of ¼ inch.

5. The wall mounted compact disc case holder assembly as set forth in claim 4 wherein each case holder includes an internal window and a finger slot formed therein, the finger slot facilitating removal of compact disc cases positioned within the hollow interior of a holder.

6. The wall mounted compact disc case holder assembly as set forth in claim 4 wherein six case holders are included with the apparatus, the mounting clip being affixed to the top case holder.

* * * * *